United States Patent
Iijima

(10) Patent No.: US 10,126,008 B2
(45) Date of Patent: Nov. 13, 2018

(54) AIR CONDITIONER AND CONTROL PROGRAM

(71) Applicant: Mitsubishi Electric Corporation, Tokyo (JP)

(72) Inventor: Hirokazu Iijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 15/033,209

(22) PCT Filed: Dec. 11, 2014

(86) PCT No.: PCT/JP2014/082882
§ 371 (c)(1),
(2) Date: Apr. 29, 2016

(87) PCT Pub. No.: WO2015/122089
PCT Pub. Date: Aug. 20, 2015

(65) Prior Publication Data
US 2016/0265801 A1    Sep. 15, 2016

(30) Foreign Application Priority Data
Feb. 13, 2014    (JP) ................. 2014-025939

(51) Int. Cl.
*F24F 11/00*    (2018.01)
*G05B 15/02*    (2006.01)
(Continued)

(52) U.S. Cl.
CPC .......... *F24F 11/0012* (2013.01); *F24F 11/30* (2018.01); *F24F 11/62* (2018.01);
(Continued)

(58) Field of Classification Search
CPC .... F24F 11/30; F24F 2110/10; F24F 2110/12; F24F 11/62; F24F 11/64; F24F 11/70; F25B 2700/2104; F25B 2700/2106
(Continued)

(56) References Cited

U.S. PATENT DOCUMENTS 8,600,561 B1 * 12/2013 Modi ................... F24F 11/0012
                                                                    700/276
9,074,782 B2    7/2015 Kinoshita et al.
(Continued)

FOREIGN PATENT DOCUMENTS

JP    62-162840 A    7/1987
JP    4-043174 B2    7/1992
(Continued)

OTHER PUBLICATIONS

International Search Report of the International Searching Authority dated Mar. 17, 2015 for the corresponding international application No. PCT/JP2014/082882 (and English translation).
(Continued)

*Primary Examiner* — Jonathan Han
(74) *Attorney, Agent, or Firm* — Posz Law Group, PLC

(57) ABSTRACT

A storage unit stores threshold data indicating first and second thresholds. A heater control determination unit reads the threshold data from the storage unit, enables a heater control when an outdoor air temperature is equal to or lower than the first threshold, and disables the heater control when the outdoor air temperature is equal to or higher than the second threshold. A heater operation control unit sets a heater operation to be always-off when the heater control is disabled, and ON/OFF controls the heater operation based on a relation between an indoor temperature and a set temperature when the heater control is enabled. A reception unit receives a threshold designation signal input by a user
(Continued)

and designating at least one of the first and second thresholds. A threshold setting unit sets, based on designation by the received threshold designation signal, the threshold data stored in the storage unit.

8 Claims, 10 Drawing Sheets

(51) Int. Cl.
    *F24F 11/30*    (2018.01)
    *F24F 11/62*    (2018.01)
    F24F 110/10     (2018.01)
    F24F 110/12     (2018.01)
    F24F 11/63      (2018.01)

(52) U.S. Cl.
    CPC .............. *G05B 15/02* (2013.01); *F24F 11/63* (2018.01); *F24F 2110/10* (2018.01); *F24F 2110/12* (2018.01); *F24F 2221/34* (2013.01)

(58) Field of Classification Search
    USPC .................. 165/242, 250, 257; 700/276, 278
    See application file for complete search history.

(56) References Cited

U.S. PATENT DOCUMENTS

| | | | |
|---|---|---|---|
| 2003/0102121 A1* | 6/2003 | Lee | F24F 1/0007 165/240 |
| 2005/0234597 A1 | 10/2005 | Harrod et al. | |
| 2008/0179409 A1* | 7/2008 | Seem | F24F 11/0001 236/49.3 |
| 2013/0291569 A1* | 11/2013 | Subramanian | F25D 29/00 62/56 |
| 2014/0032150 A1 | 1/2014 | Follett et al. | |
| 2014/0202449 A1* | 7/2014 | Snyder | F24F 5/0035 126/714 |
| 2015/0013958 A1 | 1/2015 | Kubo | |
| 2015/0233594 A1* | 8/2015 | Abe | F24F 11/30 700/276 |

FOREIGN PATENT DOCUMENTS

| | | | | |
|---|---|---|---|---|
| JP | 4-042665 Y2 | 10/1992 | | |
| JP | 08-159536 A | 6/1996 | | |
| JP | 11-182994 A | 7/1999 | | |
| JP | 2002-181367 A | 6/2002 | | |
| JP | 2010-223455 A | 10/2010 | | |
| JP | 2010-266090 A | 11/2010 | | |
| JP | 2013-053845 A | 3/2013 | | |
| JP | 2014-025939 A | 2/2014 | | |
| JP | 2014085070 A * | 5/2014 | ......... G05D 23/1934 | |
| WO | 2010/131443 A | 11/2010 | | |
| WO | 2013/125263 A1 | 8/2013 | | |

OTHER PUBLICATIONS

Office Action dated Oct. 16, 2017 issued in the corresponding CA patent application No. 2,938,006.

Extended European Search Report dated Sep. 19, 2017 issued in the corresponding EP patent application No. 14882475.8.

Office Action dated Mar. 28, 2018 issued in corresponding CN patent application No. 201480071167.5 (and English machine translation).

Office action dated Jul. 19, 2018 issued in corresponding CN patent application No. 201480071167.5 (and English machine translation thereof).

* cited by examiner

AIR CONDITIONER AND CONTROL PROGRAM

CROSS REFERENCE TO RELATED APPLICATION

This application is a U.S. national stage application of PCT/JP2014/082882 filed on Dec. 11, 2014, and is based on Japanese Patent Application No. 2014-025939 filed on Feb. 13, 2014, the disclosures of which are incorporated herein by reference.

FIELD

The present invention relates to an air conditioner and a control program thereof.

BACKGROUND

Patent Literature 1 discloses an air conditioner that has an indoor unit and an electric heater, and performs an operation control of the electric heater as well. The air conditioner compares a lead capacitance value and an outdoor air temperature with a predetermined heater stop condition. If the load capacitance value and the outdoor air temperature satisfy the predetermined heater stop condition, the air conditioner stops an operation of the electric heater regardless of an indoor temperature.

CITATION LIST

Patent Literature

Patent Literature 1: Japanese Patent Application Laid-open No. S62-162840

SUMMARY

Technical Problem

In the case of Patent Literature 1, the heater stop condition for stopping the operation of the electric heater is fixed. Therefore, there is a possibility that the electric heater is wastefully in the ON-state even when demands can be fulfilled only by heating capacity of the indoor unit, depending on a region or an environment. This is not preferable in view of energy saving.

An object of the present invention is to provide a technique that can achieve further energy saving with regard to an air conditioner performing an operation control of a heater.

Solution to Problem

In an aspect of the present invention, an air conditioner is provided. The air conditioner has: an indoor unit; an outdoor unit to detect an outdoor air temperature; and a control device mounted on the indoor unit and performing operation controls of the indoor unit and a heater placed indoor. The control device has a storage unit, a heater control determination unit, a heater operation control unit, a reception unit, and a threshold setting unit. The storage unit stores therein threshold data indicating a first threshold and a second threshold. The heater control determination unit reads the threshold data from the storage unit, enables a control of the heater when the outdoor air temperature is equal to or lower than the first threshold, and disables the control of the heater when the outdoor air temperature is equal to or higher than the second threshold. The heater operation control unit sets an operation of the heater to be always-off when the control of the heater is disabled, and ON/OFF controls the operation of the heater based on a relation between an indoor temperature and a set temperature when the control of the heater is enabled. The reception unit receives a threshold designation signal input by a user and designating at least one of the first threshold and the second threshold. The threshold setting unit sets, based on designation by the received threshold designation signal, the threshold data stored in the storage unit.

In another aspect of the present invention, a control program for an air conditioner is provided. The air conditioner has: an indoor unit; an outdoor unit detecting an outdoor air temperature; and a computer mounted on the indoor unit and performing operation controls of the indoor unit and a heater placed indoor. The control program causes the computer to execute the following steps of: reading threshold data indicating a first threshold and a second threshold from a storage unit storing therein the threshold data; enabling a control of the heater when the outdoor air temperature is equal to or lower than the first threshold; disabling the control of the heater when the outdoor air temperature is equal to or higher than the second threshold; setting an operation of the heater to be always-off when the control of the heater is disabled; ON/OFF controlling the operation of the heater based on a relation between an indoor temperature and a set temperature when the control of the heater is enabled; receiving a threshold designation signal input by a user and designating at least one of the first threshold and the second threshold; and setting, based on designation by the received threshold designation signal, the threshold data stored in the storage unit.

Advantageous Effects of Invention

According to the present invention, it is possible to achieve further energy saving with regard to the air conditioner performing the operation control of the heater.

DESCRIPTION OF EMBODIMENTS

An air conditioner according to embodiments of the present invention will be described with reference to the accompanying drawings.

First Embodiment.
<Outline>

Figure 1:
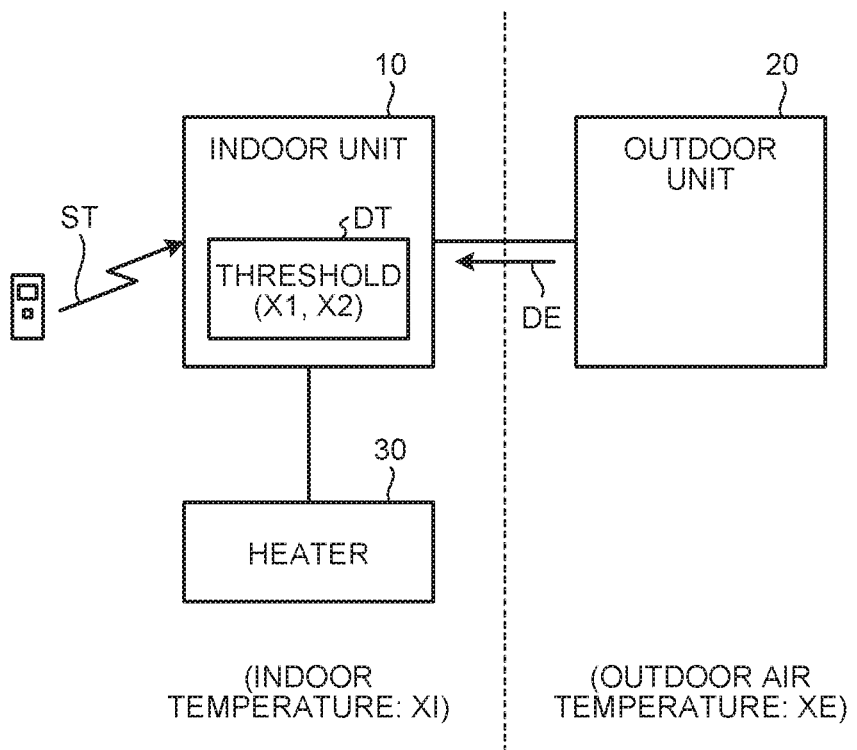
FIG. 1 is a block diagram illustrating an outline of a first embodiment of the present invention.

FIG. 1 is a block diagram illustrating an outline of a first embodiment of the present invention. An air conditioner 1 has an indoor unit 10 placed indoor and an outdoor unit 20 placed outdoor. Furthermore, a heater 30 is placed indoor. The heater 30 is used as an auxiliary heat source at a time of a heating operation. Typically, the heater 30 is an electric heater. It should be noted that the heater 30 may be, or may not be, a constituent element of the air conditioner 1.

The air conditioner 1 according to the present embodiment has a function of performing operation controls of the heater 30 as well as the indoor unit 10 and the outdoor unit 20. More specifically, the indoor unit 10 (a control device of the indoor unit 10, described later) has a function of performing an operation control of the heater 30. Basically, the operation control of the heater 30 is performed at the time of the heating operation. In the following description, it is assumed that the air conditioner 1 is performing the heating operation, unless otherwise specified.

The operation control of the heater 30 includes (A) determining whether to enable or disable a control of the heater 30, and (B) ON/OFF controlling an operation of the heater 30.

The former (A), namely, determining whether to enable or disable the control of the heater 30 is performed based on an outdoor air temperature XE. The outdoor air temperature XE is detected by the outdoor unit 20, and outdoor air temperature data DE indicating the detected outdoor air temperature XE is transmitted from the outdoor unit 20 to the indoor unit 10. Meanwhile, the indoor unit 10 holds threshold data DT indicating a first threshold X1 and a second threshold X2. The first threshold X1 and the second threshold X2 are criteria used for determining whether to enable or disable the control of the heater 30.

Figure 2:
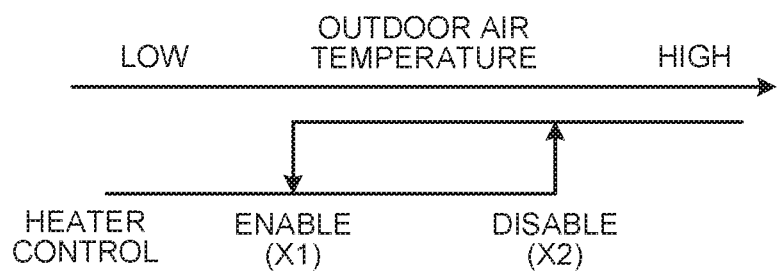
FIG. 2 is a conceptual diagram for explaining enabling/disabling of a heater control in an air conditioner according to the first embodiment of the present invention.

More specifically, as shown in FIG. 2, when the outdoor air temperature XE becomes equal to or lower than the first threshold X1, the indoor unit 10 enables the control of the heater 30. On the other hand, when the outdoor air temperature XE becomes equal to or higher than the second threshold X2, the indoor unit 10 disables the control of the heater 30. In a case where the first threshold X1 and the second threshold X2 are equal to each other (X1=X2), switching between enabling and disabling may be caused repeatedly in a short time due to disturbance of the outdoor air temperature XE. From a viewpoint of a stable control, a hysteresis characteristic such as the first threshold X1 being lower than the second threshold X2 (X1<X2) as shown in FIG. 2 is preferable. However, the present embodiment does not eliminate a case where the first threshold X1 and the second threshold X2 are equal to each other.

Figure 3:
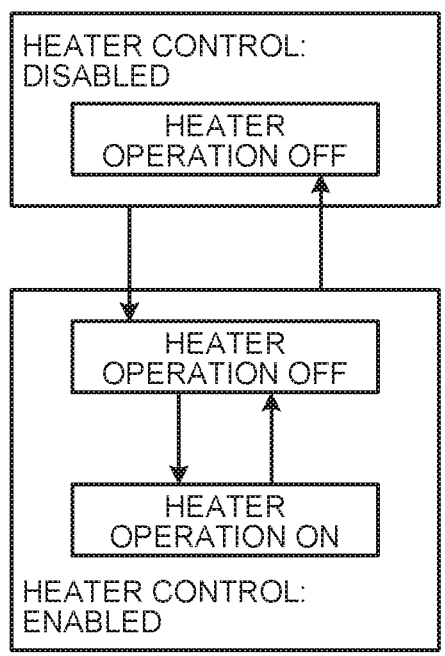
FIG. 3 is a conceptual diagram for explaining ON/OFF control of a heater operation in the air conditioner according to the first embodiment of the present invention.

Next, the latter (B), namely, ON/OFF controlling the operation of the heater 30 will be described with reference to FIG. 3. When the control of the heater 30 is disabled, the indoor unit 10 sets the operation of the heater 3C to be always-off. On the other hand, when the control of the heater 30 is enabled, the indoor unit 10 ON/OFF controls the operation of the heater 30.

More specifically, the indoor unit 10 ON/OFF controls the operation of the heater 30 based on a relation between an indoor temperature XI and a set temperature. For example, when the indoor temperature XI is lower than the set temperature, the indoor unit 10 turns ON the operation of the heater 30. On the other hand, when the indoor temperature XI is higher than the set temperature, the indoor unit 130 turns OFF the operation of the heater 30.

Referring to FIG. 1 again, according to the present embodiment, the threshold data DT, that is, the first threshold X1 and the second threshold X2 can be variably set. More specifically, a threshold designation signal ST designating at least one of the first threshold X1 and the second threshold X2 is input to the indoor unit 10 by a user. Typically, the user operates a wireless remote controller to transmit the threshold designation signal ST to the indoor unit 10. Note that the method of inputting the threshold designation signal ST is not limited to the transmission with the wireless remote controller. Then, the indoor unit 10 sets (updates) the content of the threshold data DT based on the designation by the received threshold designation signal ST.

In this manner, according to the present embodiment, the threshold data DT used as the criteria for determining whether to enable or disable the control of the heater 30 is variable. That is, it is possible to freely set the threshold data DT depending on a region or an environment in which the air conditioner 1 is placed. Therefore, such the situation as the heater 30 is wastefully in the ON-state even when demands can be fulfilled only by heating capacity of the indoor unit 10 can be prevented from occurring. That is to say, it is possible to achieve further energy saving according to the present embodiment.

<Configuration Example of Indoor Unit 10>

Figure 4:
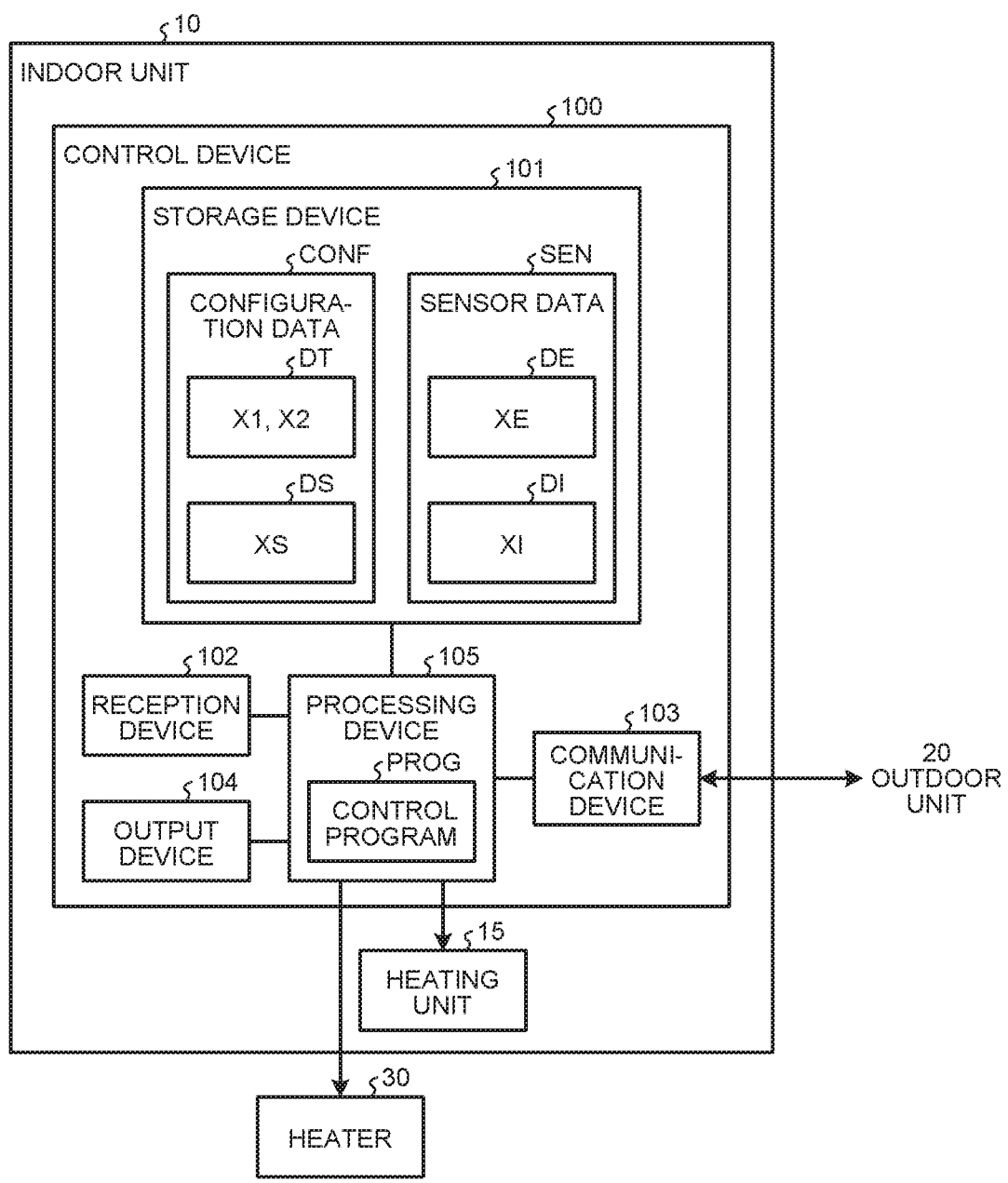
FIG. 4 is a block diagram illustrating an example of a configuration of an indoor unit of the air conditioner according to the first embodiment of the present invention.

FIG. 4 is a block diagram illustrating an example of a configuration of the indoor unit 10 according to the present embodiment. The indoor unit 10 has a heating unit 15 and a control device 100. The heating unit 15 is a unit that performs the heating operation of the indoor unit 10. The control device 100 (computer) performs not only an operation control of the heating unit 15 (that is, the indoor unit 10) but also an operation control of the heater 30. The control device 100 has a storage device 101, a reception device 102, a communication device 103, an output device 104, and a processing device 105.

The storage device 101 includes an HDD, a RAM, a nonvolatile memory, a register, and the like. Various data including configuration data CONF and sensor data SEN are stored in the storage device 101.

The configuration data CONF includes the threshold data DT indicating the first threshold X1 and the second threshold X2 and set temperature data DS indicating the set temperature XS. The threshold data DT and the set temperature data DS can be variably set by a user. Therefore, for example, the configuration data CONF is stored in a rewritable nonvolatile memory.

The sensor data SEN includes the outdoor air temperature data DE indicating the outdoor air temperature XE and indoor temperature data DI indicating the indoor temperature XI. The outdoor air temperature data DE and the indoor temperature data DI are generated by sensors and transmitted to the control device 100. For example, the sensor data SEN is stored in a RAM or a register.

The reception device 102 receives a setting signal input by a user. The setting signal includes the above-mentioned threshold designation signal ST for setting the threshold data DT and a set-temperature designation signal for setting the set temperature data DS. Typically, the setting signal is transmitted from a wireless remote controller by a user.

The communication device 103 performs data communication with the outdoor unit 20. For example, the communication device 103 receives the outdoor air temperature data DE indicating the outdoor air temperature XE detected by the outdoor unit 20.

The output device 104 includes a display device and a speaker, and provides various notices to the user.

The processing device 105 executes controls of respective devices and computation of various data. Particularly, the processing device 105 executes a control program PROG to perform an operation control of the heater 30 described below. Note that the control program PROG can be recorded on a computer-readable recording medium.

<Operation Control of Heater 30>

Figure 5:
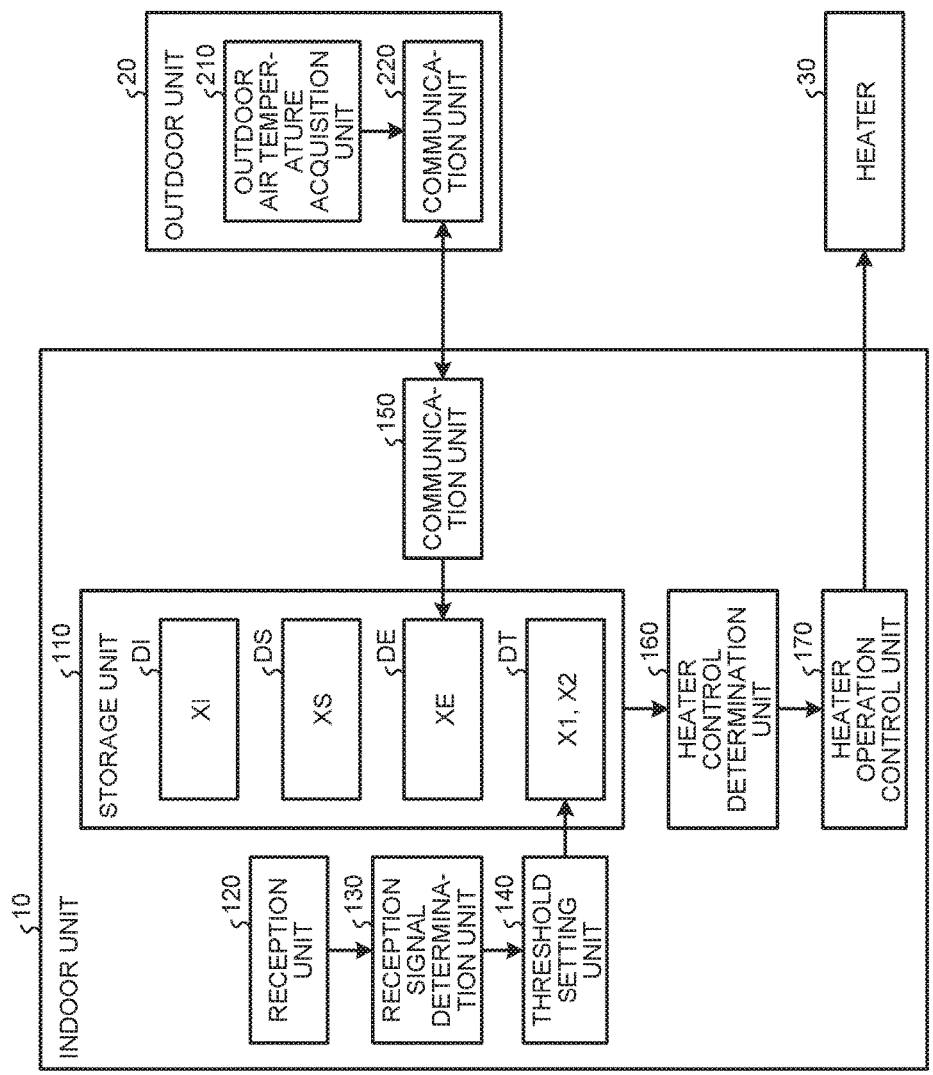
FIG. 5 is a block diagram illustrating an example of a functional configuration of the air conditioner according to the first embodiment of the present invention.

FIG. 5 illustrates a functional configuration (functional blocks) related to the operation control of the heater 30. The indoor unit 10 (the control device 100) has a storage unit 110, a reception unit 120, a reception signal determination unit 130, a threshold setting unit 140, a communication unit 150, a heater control determination unit 160, and a heater operation control unit 170.

The storage unit 110 stores therein the threshold data DT, the set temperature data DS, the outdoor air temperature data DE, and the indoor temperature data DI. The storage unit 110 is realized by the storage device 101. The reception unit 120 is realized by the reception device 102. The communication unit 150 is realized by the communication device 103. The reception signal determination unit 130, the threshold setting unit 140, the heater control determination unit 160, and the heater operation control unit 170 are realized by the processing device 105 executing the control program PROG.

Figure 6:
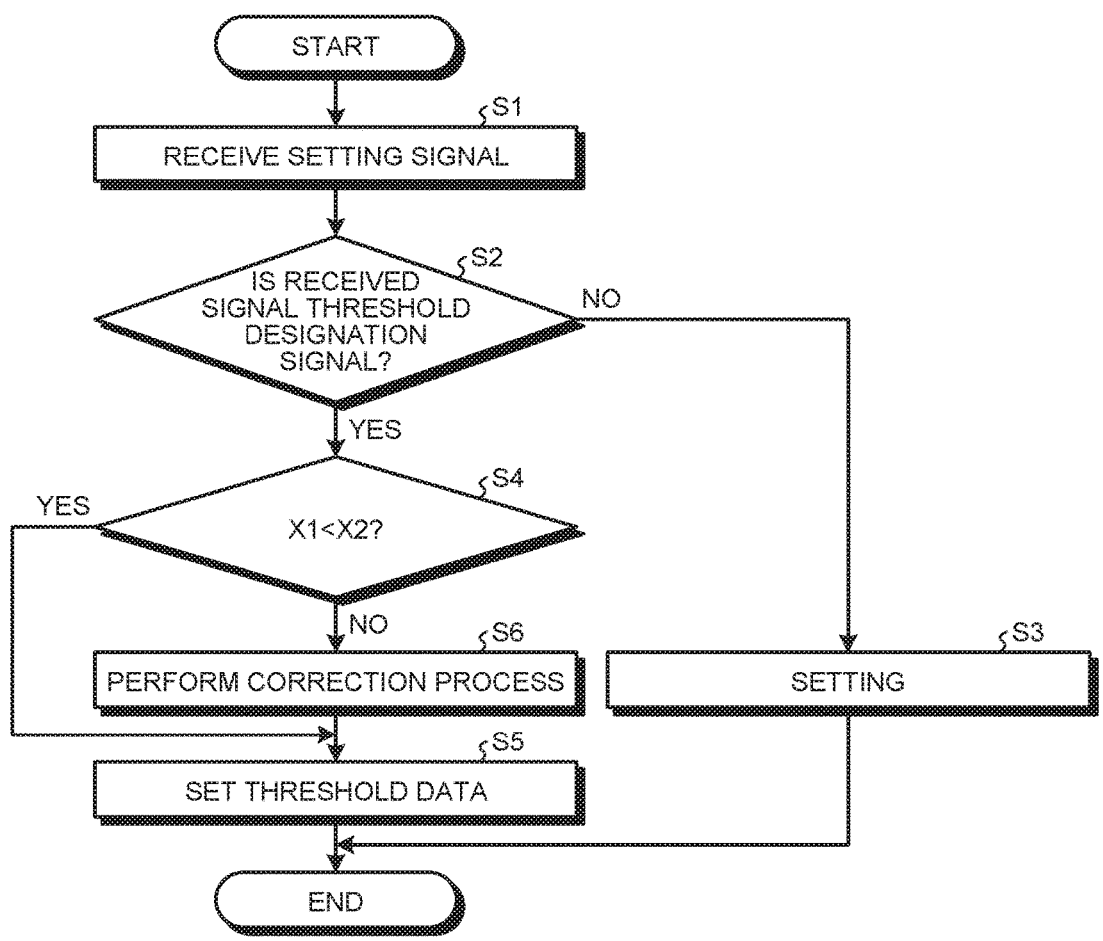
FIG. 6 is a flowchart illustrating a process flow in the air conditioner according to the first embodiment of the present invention.

First, an example of a flow of setting the threshold data DT will be described with reference to FIG. 6.

Step S1:

The reception unit 120 receives a setting signal input by a user. The setting signal includes the threshold designation signal ST for setting the threshold data DT and the set-temperature designation signal for setting the set temperature data DS.

Step S2:

The reception signal determination unit 130 determines whether or not the setting signal received by the reception unit 120 is the threshold designation signal ST.

Step S3:

If the received setting signal is the set-temperature designation signal (Step S2; No), the set temperature data DS (that is, the set temperature XS) is set in accordance with the set-temperature designation signal.

Step S4:

If the received setting signal is the threshold designation signal ST (Step S2; Yes), the threshold designation signal ST designates at least one of the first threshold X1 and the second threshold X2. Here, the threshold setting unit 140 checks a content designated by the threshold designation signal ST. More specifically, the threshold setting unit 140 checks whether or not a relation "X1<X2" is satisfied when the threshold data DT is updated in accordance with the designation by the threshold designation signal ST.

Step S5:

If the relation "X1<X2" is satisfied (Step S4; Yes), the threshold setting unit 140 sets (updates), based on the designation by the threshold designation signal ST, the threshold data DT stored in the storage unit 110.

Step S6:

On the other hand, if the relation "X1<X2" is not satisfied, that is, if the first threshold X1 becomes equal to or higher than the second threshold X2 (Step S4; No), the threshold setting unit 140 performs a correction process. More specifically, the threshold setting unit 140 corrects the designation such that the relation "X1<X2" is satisfied. For example, the threshold setting unit 140 corrects the first threshold X1 according to a relational expression "X1=X2−α (α: a positive number)". After that, the process proceeds to Step S5. In this case, the threshold setting unit 140 sets (updates) the threshold data DT stored in the storage unit 110 in accordance with the corrected designation. Due to the correction process described above, it is possible to automatically avoid erroneous setting.

It should be noted that in Step S6, the threshold setting unit 140 may output an alarm by using the output device 104, instead of or along with the correction process. The alarm includes error display on a display device and ringing of a buzzer. As a result, it is possible to prompt a user to perform resetting.

Figure 7:
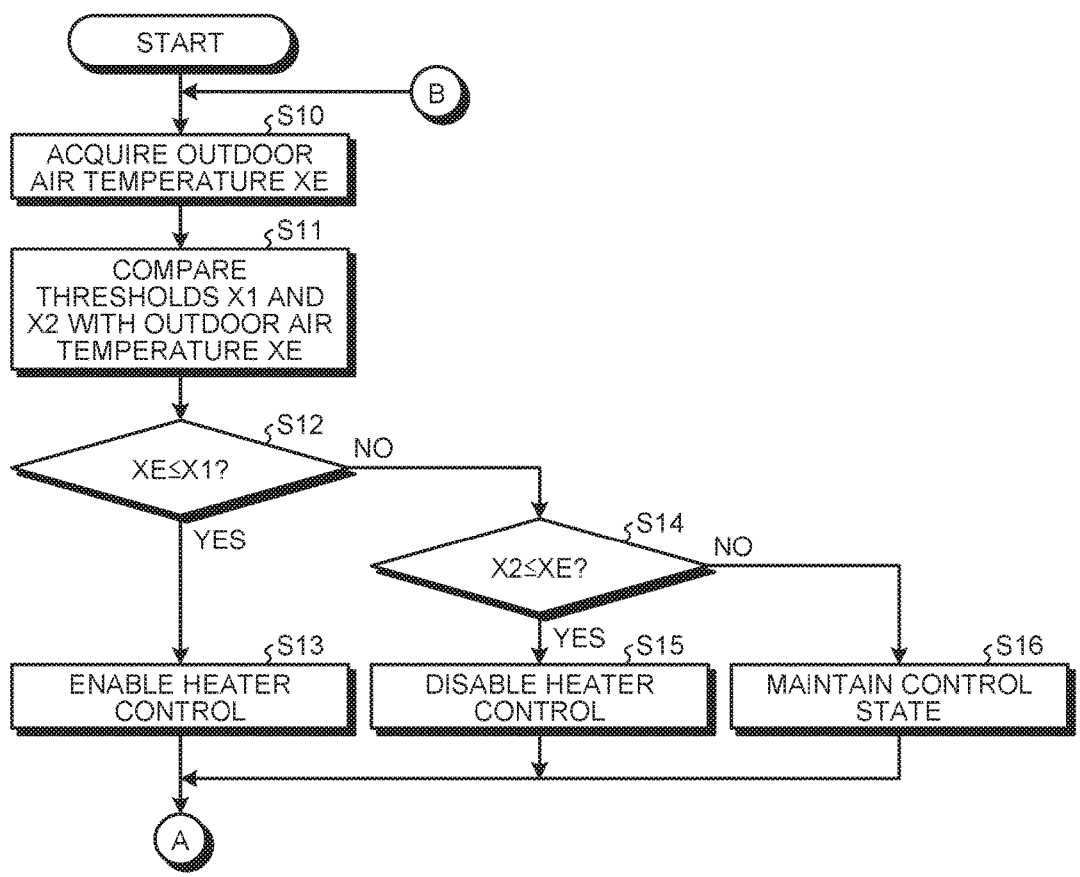
FIG. 7 is a flowchart illustrating a process flow in the air conditioner according to the first embodiment of the present invention.

Next, an example of the operation control of the heater 30 will be described with reference to FIGS. 7 and 8.

Step S10:

An outdoor air temperature acquisition unit 210 of the outdoor unit 20 detects the outdoor air temperature XE, and generates the outdoor air temperature data DE indicating the detected outdoor air temperature XE. A communication unit 220 of the outdoor unit 20 transmits the outdoor air temperature data DE to the indoor unit 10. The communication unit 150 of the indoor unit 10 receives the outdoor air temperature data DE from the outdoor unit 20. The outdoor air temperature data DE is stored in the storage unit 110.

Step S11:

The heater control determination unit 160 reads the threshold data DT and the outdoor air temperature data DE from the storage unit 110. Then, the heater control determination unit 160 compares the first threshold X1 and the second threshold X2 with the outdoor air temperature XE.

Step S13:

When the outdoor air temperature XE is equal to or lower than the first threshold X1 (Step S12; Yes), the heater control determination unit 160 enables the control of the heater 30. After that, the process proceeds to Step S20.

Step S15:

When the outdoor air temperature XE is equal to or higher than the second threshold X2 (Step S12; No, Step S14; Yes), the heater control determination unit 160 disables the control of the heater 30. After that, the process proceeds to Step S20.

Step S16:

When the outdoor air temperature XE is higher than the first threshold X1 and is lower than the second threshold X2 (Step S12; No, Step S14; No), the heater control determination unit 160 maintains the current control state. After that, the process proceeds to Step S20.

Step S20:

The heater operation control unit 170 checks whether the control of the heater 30 is enabled or disabled.

Step S21:

When the control of the heater 30 is enabled (Step S20; Yes), the heater operation control unit 170 reads the indoor temperature data DI and the set temperature data DS from the storage unit 110. Then, the heater operation control unit 170 compares the indoor temperature XI and the set temperature XS.

Step S22:

When the indoor temperature XT is lower than the set temperature XS (Step S21; Yes), the heater operation control unit 170 turns ON the operation of the heater 30. After that, the process proceeds to Step S24.

Step S23:

On the other hand, when the indoor temperature XI is higher than the set temperature XS (Step S21; No), the heater operation control unit 170 turns OFF the operation of the heater 30. Also, when the control of the heater 30 is disabled (Step S20; No), the heater operation control unit 170 turns OFF the operation of the heater 30. After that, the process proceeds to Step S24.

Step S24:

The acquisition of the outdoor air temperature XE is performed regularly, for example. When it comes to an acquisition timing of the outdoor air temperature XE (Step S24; Yes), the process returns back to Step S10. In other cases (Step S24; No), the process returns back to Step S20. The above-described process is performed each time the outdoor air temperature XE is updated.

<Effects>

As described above, according to the present embodiment, the threshold data DT used as the criteria for determining whether to enable or disable the control of the heater 30 is variable. That is, it is possible to freely set the threshold data DT depending on a region or an environment in which the air conditioner 1 is placed. Therefore, such the situation as the heater 30 is wastefully in the ON-state even when demands can be fulfilled only by heating capacity of the indoor unit 10 can be prevented from occurring. That is to say, it is possible to achieve further energy saving according to the present embodiment.

Second Embodiment.

Figure 9:
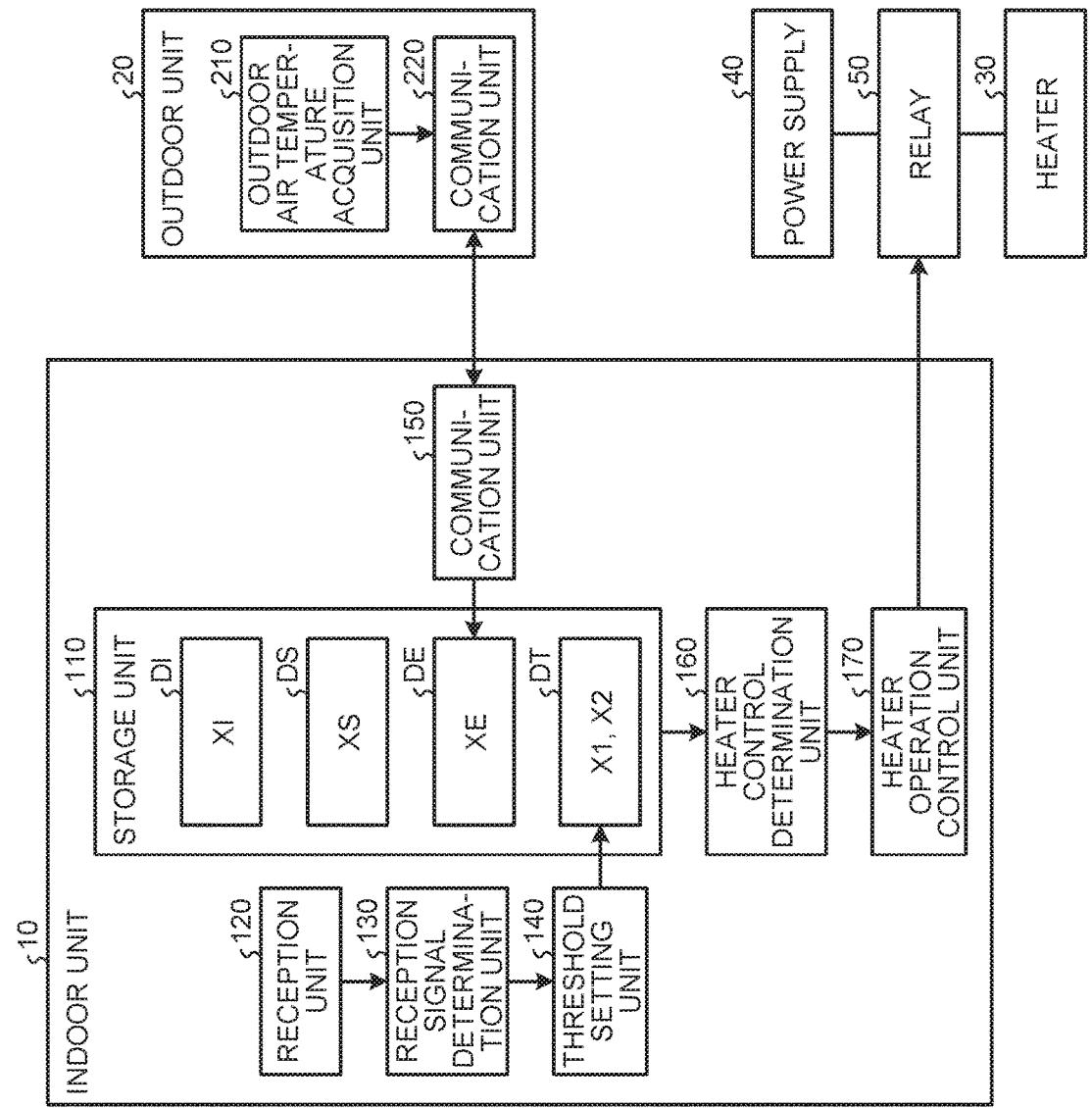
FIG. 9 is a block diagram illustrating an example of a functional configuration of an air conditioner according to a second embodiment of the present invention.

FIG. 9 is a block diagram illustrating an example of a functional configuration of the air conditioner 1 according to a second embodiment of the present invention. Overlapping description with the first embodiment will be omitted as appropriate.

In the present embodiment, a relay 50 is connected between the heater 30 and a power supply 40. The heater operation control unit 170 ON/OFF controls the operation of the heater 30 by switching the relay 50. Here, high-frequency switching of the relay 50 causes welding. Therefore, in the present embodiment, the heater operation control unit 170 prohibits a next switching for a certain period of time after switching the switching state of the relay 50. That is to say, the heater operation control unit 170 prohibits ON/OFF switching of the operation of the heater 30 for a certain period of time after performing ON/OFF switching of the operation of the heater 30.

Figure 8:
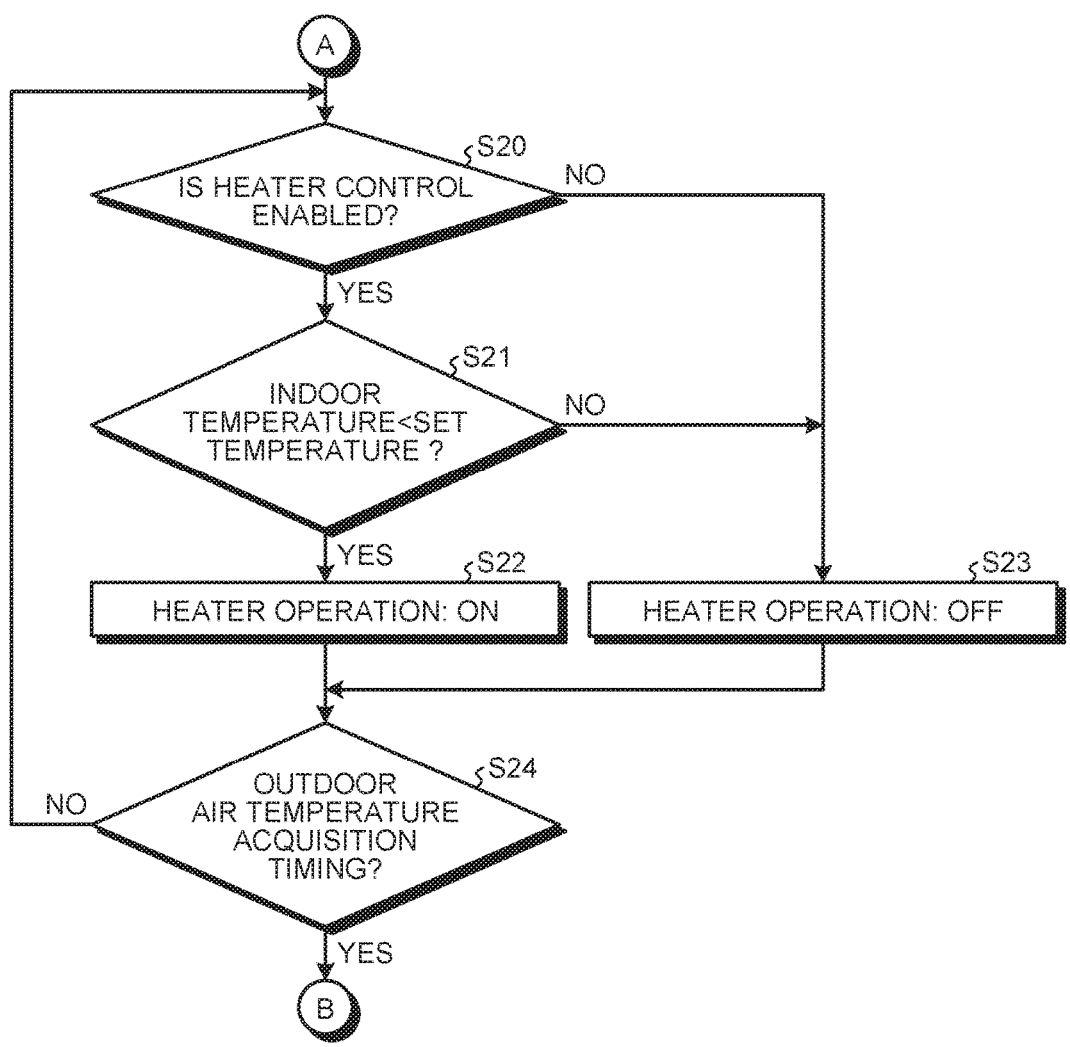
FIG. 8 is a flowchart illustrating a process flow in the air conditioner according to the first embodiment of the present invention.
Figure 10:
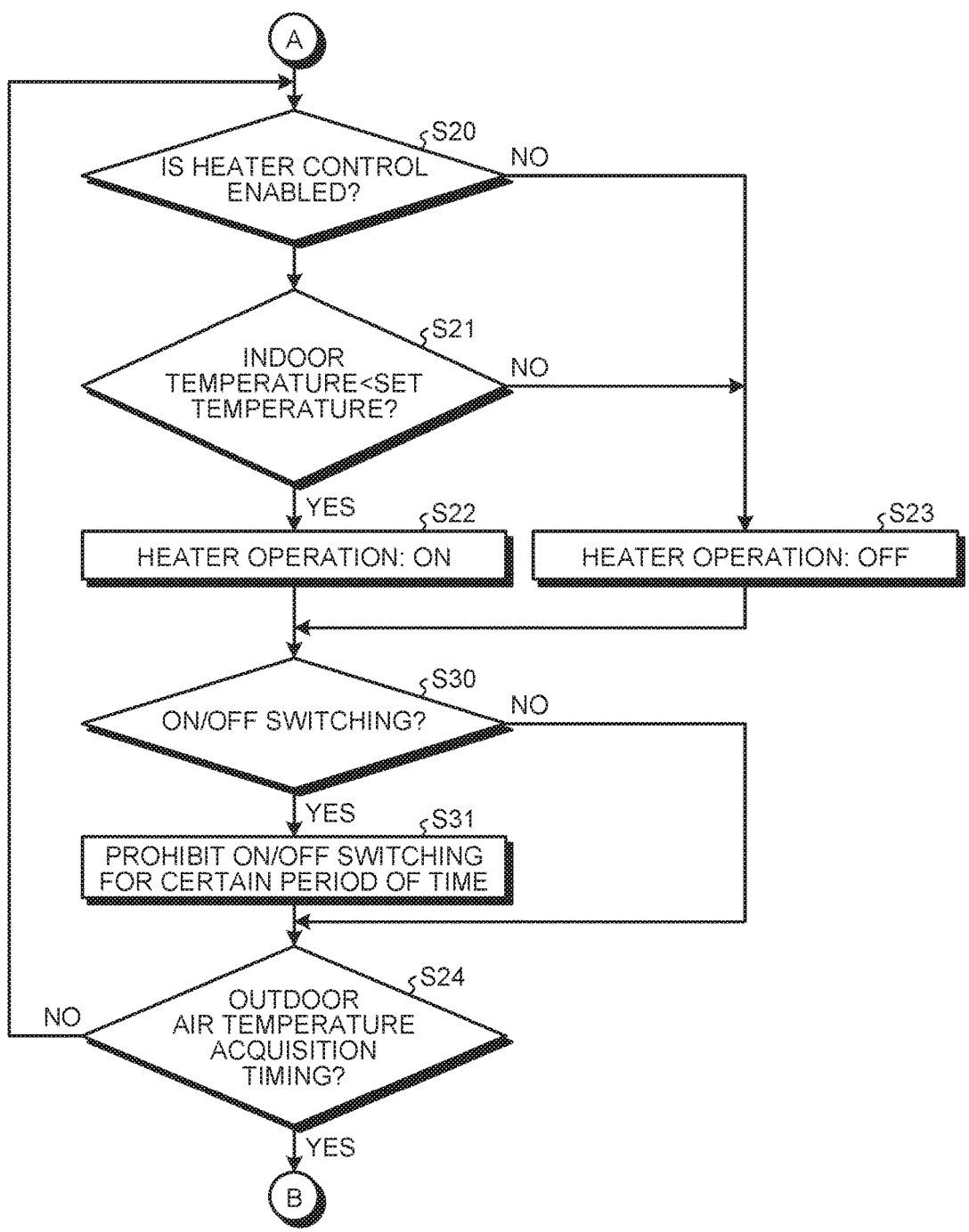
FIG. 10 is a flowchart illustrating a process flow in the air conditioner according to the second embodiment of the present invention.

FIG. 10 is a flowchart illustrating an operation of the heater operation control unit 170 in the present embodiment and corresponds to the foregoing FIG. 8. As compared with FIG. 8, Steps S30 and S31 are added between Step S22 or S23 and Step S24.

At Step S30, the heater operation control unit 170 checks whether or not ON/OFF switching of the heater 30 has occurred at the previous Step S22 or S23. If no ON/OFF switching has occurred (Step S30; No), the process proceeds to Step S24. On the other hand, if ON/OFF switching has occurred (Step S30; Yes), the heater operation control unit 170 prohibits ON/OFF switching of the heater 30 for a certain period of time (Step S31). For example, the heater operation control unit 170 interrupts the control flow for a certain period of time.

According to the present embodiment, an effect that the welding of the relay 50 is prevented can be obtained in addition to the same effects as in the case of the first embodiment. As a result, product quality is improved.

Third Embodiment.

Figure 11:
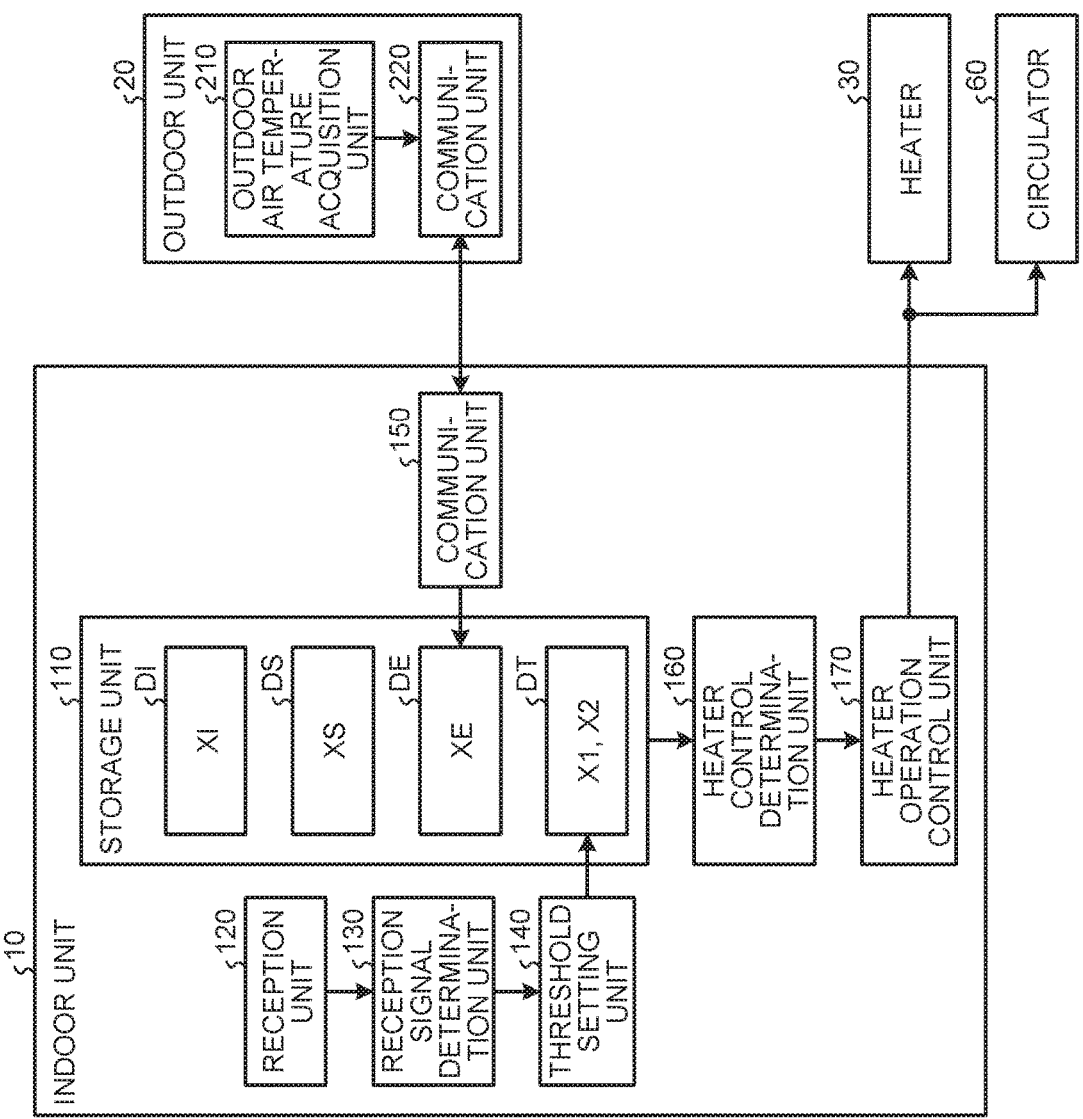
FIG. 11 is a block diagram illustrating an example of a functional configuration of an air conditioner according to a third embodiment of the present invention.

FIG. 11 is a block diagram illustrating an example of a functional configuration of the air conditioner 1 according to a third embodiment of the present invention. Overlapping description with the first embodiment will be omitted as appropriate.

In the present embodiment, a circulator 60 is provided along with the heater 30. The heater operation control unit 170 ON/OFF controls the circulator 60 in conjunction with ON/OFF of the operation of the heater 30. As the heater 30 and the circulator 60 operate in conjunction with each other, warm air is diffused and comfort is improved.

According to the present embodiment, an effect that the comfort is improved can be obtained in addition to the same effects as in the case of the first embodiment. It should be noted that a combination of the second embodiment and the third embodiment also is possible.

Embodiments of the present invention have been described above with reference to the accompanying drawings. It should be noted that the present invention is not limited to the embodiments described above, and can be modified as appropriate by persons skilled in the art without departing from the scope thereof.

REFERENCE SIGNS LIST 1 air conditioner, 10 indoor unit, 15 heating unit, 20 outdoor unit, 30 heater, 40 power supply, 50 relay, 60 circulator, 100 control device, 101 storage device, 102 reception device, 103 communication device, 104 output device, 105 processing device, 110 storage unit, 120 reception unit, 130 reception signal determination unit, 140 threshold setting unit, 150 communication unit, 160 heater control determination unit, 170 heater operation control unit, 210 outdoor air temperature acquisition unit, 220 communication unit, CONF configuration data, DE outdoor air temperature data, DI indoor temperature data, DS set temperature data, DT threshold data, PROG control program, SEN sensor data, ST threshold designation signal, X1 first threshold, X2 second threshold, XE outdoor air temperature, XI indoor temperature, XS set temperature.

The invention claimed is:

1. An air conditioner comprising:
  an indoor unit;
  an outdoor unit configured to detect an outdoor air temperature; and
  a controller mounted on the indoor unit and configured to perform operational control of the indoor unit and a heater placed indoors, the heater providing an auxiliary heat source to the indoor unit at a time of a heating operation,
  wherein the controller comprises:
  a storage unit configured to store therein threshold data indicating a first threshold and a second threshold;
  a heater control determination unit configured to read the threshold data from the storage unit, to enable a control of the heater when the outdoor air temperature is equal to or lower than the first threshold, and to disable the control of the heater when the outdoor air temperature is equal to or higher than the second threshold;

a heater operation control unit configured to enable or disable a control of the heater, during disabled control of the heater an operation of the heater is set to be always-off, and during enabled control of the heater the heater is set to ON/OFF control which includes the heater switching between ON and OFF based on a relation between an indoor temperature and a set temperature;

a reception unit configured to receive a threshold designation signal input by a user and designating the received threshold designation signal as at least one of the first threshold and the second threshold; and a threshold setting unit configured to set, based on the designation of the received threshold designation signal by the reception unit, the threshold data stored in the storage unit.

2. The air conditioner according to claim 1, wherein the first threshold is lower than the second threshold.

3. The air conditioner according to claim 2, wherein if the first threshold becomes equal to or higher than the second threshold as a result of the designation by the reception unit of the received threshold designation signal, the threshold setting unit corrects the designation such that the first threshold becomes lower than the second threshold and then sets the threshold data stored in the storage unit in accordance with the corrected designation.

4. The air conditioner according to claim 2, wherein if the first threshold becomes equal to or higher than the second threshold as a result of the designation by the reception unit of the received threshold designation signal, the threshold setting unit outputs an alarm.

5. The air conditioner according to claim 1, wherein when the control of the heater is enabled, the heater operation control unit turns ON the operation of the heater when the indoor temperature is lower than the set temperature and turns OFF the operation of the heater when the indoor temperature is higher than the set temperature.

6. The air conditioner according claim 1, wherein the heater operation control unit performs ON/OFF operation of the heater by switching a relay connected between the heater and a power supply, and the heater operation control unit prohibits ON/OFF switching of the operation of the heater for a certain period of time after performing ON/OFF switching of the operation of the heater.

7. The air conditioner according to claim 1, wherein the heater operation unit controls operation of a circulator to be either ON or OFF in conjunction with switching between ON and OFF operation of the heater.

8. A non-transitory recording medium on which a control program for an air conditioner is recorded,
wherein the air conditioner comprises:
an indoor unit;
an outdoor unit configured to detect an outdoor air temperature; and
a computer mounted on the indoor unit and configured to perform operational control of the indoor unit and a heater placed indoors,
wherein the control program causes the computer to execute steps of:
reading threshold data indicating a first threshold and a second threshold from a storage unit storing therein the threshold data;
enabling a control of the heater when the outdoor air temperature is equal to or lower than the first threshold;
disabling the control of the heater when the outdoor air temperature is equal to or higher than the second threshold;
setting an operation of the heater to be always-off when the control of the heater is disabled;
ON/OFF controlling the operation of the heater based on a relation between an indoor temperature and a set temperature when the control of the heater is enabled;
receiving a threshold designation signal input by a user and designating at least one of the first threshold and the second threshold; and
setting, based on designation by the received threshold designation signal, the threshold data stored in the storage unit.

* * * * *